May 19, 1959

E. L. HAHN 2,887,673

PULSED NUCLEAR INDUCTION SPIN ECHO TECHNIQUE

Filed Nov. 13, 1951

INVENTOR.
Erwin L. Hahn

May 19, 1959

E. L. HAHN 2,887,673

PULSED NUCLEAR INDUCTION SPIN ECHO TECHNIQUE

Filed Nov. 13, 1951

INVENTOR.
Erwin L. Hahn

INVENTOR.
Erwin L. Hahn

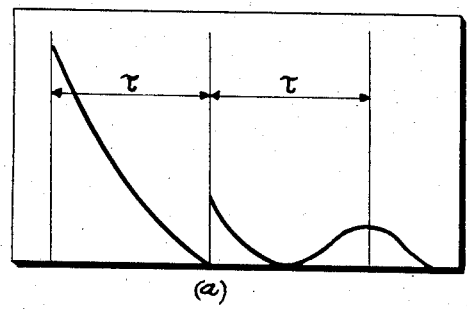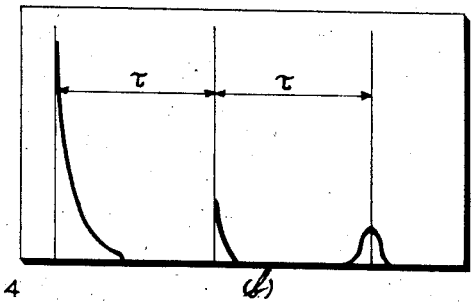
FIG. 4
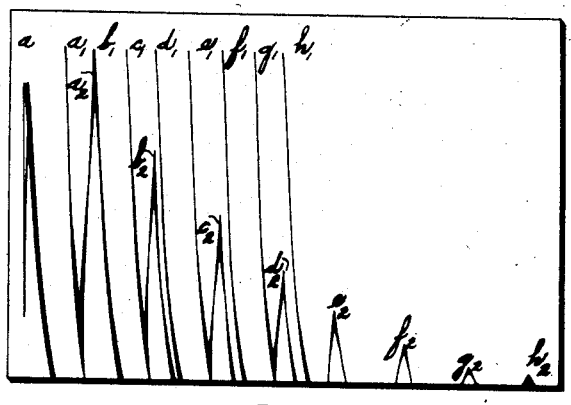
FIG. 5
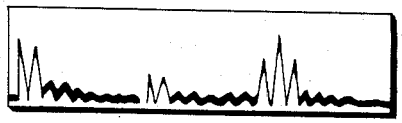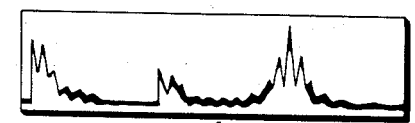
FIG. 6
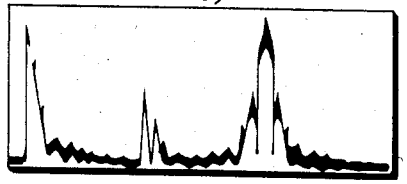

United States Patent Office 2,887,673
Patented May 19, 1959

2,887,673
PULSED NUCLEAR INDUCTION SPIN ECHO TECHNIQUE

Erwin L. Hahn, Palo Alto, Calif.

Application November 13, 1951, Serial No. 256,111

21 Claims. (Cl. 340—173)

This invention relates, generally, to gyromagnetic resonance methods and apparatus and the invention relates more particularly to a novel method and apparatus for providing gyromagnetic resonance utilizing pulsed radio frequency driving energy applied to an ensemble of nuclear or other gyromagnetic spins in a polarizing magnetic field.

The objects of this invention are to provide method and means for qualitative and quantitative chemical analysis; to provide means for establishing resonance between the precession frequency of atomic nuclei or other gyromagnetic bodies and the oscillations of an R-F oscillator which are provided in the form of pulses or other recurrent signals of arbitrary shape and amplitude; to provide a method for exciting an ensemble of magnetic moments of gyromagnetic bodies by the resonance field derived from an arbitrary sequence of said pulses; to provide a means of obtaining spontaneous induction signals from gyromagnetic substances in the absence of a driving radio-frequency field; to obtain a distribution of spontaneous induction signals (hereafter denoted by spin echoes) in intensity, shape, and time which can be uniquely related to a sequence of radio frequency signals applied to an ensemble of gyromagnetic resonators or, in other words, to a spin ensemble in the past; to provide coupling, by means of gyromagnetic precession, between a coil and the net magnetic moment of a spin ensemble, where the net magnetic moment which effectively couples is determined by the interaction in the past between the spin ensemble, a constant magnetic field, and alternating magnetic fields; to measure the self-diffusion coefficients of molecules; to detect the presence of paramagnetic substances; to measure accurately the lifetimes in which magnetic moments of gyromagnetic bodies remain magnetically energized; to measure accurately the rate with which energized magnetic moments lose phase coherence in Larmor precession; to measure properties and identify the presence of specific molecules which contain resonant gyromagnetic bodies by means of accurate measurement of phase coherence and magnetically energized lifetimes (hereafter referred to in general as relaxation times); to detect, under certain conditions, whether two or more magnetic moments, either the same or different, are or are not close neighbors in a molecule; to measure relaxation times in a manner which is not completely limited by external electromagnetic field inhomogeneities over the sample; to provide a high resolution method for measuring small differences in resonant Larmor frequencies between chemically non-equivalent magnetic moments in molecules where they are close neighbors; to provide means for tracing the course of certain reactions involving a change of valence, in which the element being traced is paramagnetic in one valence and diamagnetic in another; to provide means for accurate measurement of magnetic fields; to provide means for the analysis of the variation in space of a fixed magnetic field over the volume contained by the spin ensemble of gyromagnetic bodies. It is of technical interest to consider the possibility of applying spin echo patterns as a type of memory device.

In order to explain this invention, it is first necessary that the reader be acquainted with the basic teachings of gyromagnetic resonance. Reference is therefore made to Bloch et al., U.S. Patent 2,561,489, July 24, 1951, particularly from line 52, column 1 up to column 7, line 34.

Since the above cited patent refers to nuclei to explain the invention, that pattern will be followed here also. It should be understood that the present invention applies to electron resonance and all other types of gyromagnetic resonance as well as nuclear resonance. As used herein, the terms "gyromagnetic bodies" or "gyromagnetic resonators" mean those bodies possessing the properties of angular momentum or in other words gyroscopic moment and magnetic moment, while the term "gyromagnetic resonance" means resonance of gyromagnetic bodies.

The above cited patent describes nuclear induction techniques under the assumption that transient effects be ignored. The purpose of this invention is to take advantage of transient effects by a special technique in which the precession or radio frequency driving field is applied only in short time intervals. In the following paragraphs a description of conditions particular to this invention will be necessary for a discussion of transient effects upon which this invention depends.

In practice, the $H_0$ field, which is the constant unidirectional magnetic field in which precession and polarization takes place, is not perfectly homogeneous for all the nuclei throughout the volume of the sample, but instead varies in a manner which is determined by the particular inhomogeneities of the magnet. This condition of inhomogeneity will be shown to be of advantage, as it permits the manifestation of an effect particular to this invention. One may consider the entire macroscopic nuclear resonance effect as being produced by an aggregate of individual groups of nuclei. Each such individual group of nuclei, which is a macroscopic concept, is in turn made up of all of the preponderance of nuclei oriented in the z direction which are located in a small volume element of the sample. Over each small volume element, the magnetic field $H_0$ is considered to be homogeneous and the magnetic moments of these preponderances of nuclei in each individual group are considered as being resolved into one magnetic moment per group which shall be labeled an isochromatic moment. The isochromatic moment of each group, when tipped away from the z axis by the $H_1$ field (the means by which this is accomplished shall be explained later) through an angle $\theta$, will precess at a Larmor frequency defined by $$\frac{\mu}{I}H_0$$

where $\mu$=the magnetic moment of a nucleus and $I$=the gyroscopic moment of the nucleus. The field $H_0$ is different and distinct for each isochromatic moment. The $H_1$ field can be removed and each isochromatic moment will continue to precess at its corresponding Larmor frequency $\omega_0$ for a time known as its damping time, which is the time it takes this precessing motion to damp out. This time, denoted by $T_2$, is the time for which the Larmor precession maintains an appreciable phase memory among the many precessing microscopic nuclear magnetic moments that contribute to the isochromatic moments.

It is important to consider at this point a unique property of the microscopic nuclear magnetic moments contained in molecules in the liquid state. In many liquids and gases the local magnetic fields which a given nuclear magnetic moment sees due to its neighbors averages out completely to zero over a Larmor period. This results because the tumbling and translational frequencies common to liquid molecules at normal temperatures are extremely large compared to the Larmor frequency of precession (greater by a factor of $10^4$ to $10^5$). During one Larmor period of precession the field due to a neighboring dipole does not remain at a given value long enough to seriously influence the average rate of precession determined by the externally applied field $H_0$. Therefore, each isochromatic moment has a given magnitude according to how much volume is assigned to each value of $H_0$ as it varies in space continuously over the sample. Such a gradation may be described by some symmetric distribution, where the maximum number of nuclear magnetic moments may see an $H_0=7000$ gauss, for example. A smaller number of nuclear magnetic moments see values of $H_0$ lesser and greater than 7000 gauss in consequence only of the inhomogeneity of the external magnetic field over the sample. We summarize by the statement that in the liquid state, the Larmor frequency of precession which persists is determined by the $H_0$ field.

For nuclear magnetic moments in the solid state, the $H_0$ field will have superimposed upon it a range of discrete and persisting values of local magnetic dipole fields at the position of a given magnetic moment. This comes about in the solid lattice because the positions and orientations of molecules which contain nuclear magnetic moments are relatively fixed. Dipole fields will have static values of magnetic field which exist for times which may be comparable to the Larmor period. The present invention is applicable to the observation of free nuclear induction signals, and, more generally, free gyromagnetic induction signals in all phases of matter. However, the explanation which follows will deal with the case for nuclear resonance response in liquids and gases.

In order to understand the constructive interference or echo effect which is utilized in this invention, it will be convenient to consider a special case in which the isochromatic moments are tipped away from the z axis by varying the $H_1$ field. Consideration of this special case of varying $H_1$ does not imply that the mechanism to be explained is fundamentally different for other values of parameters which are varied in this invention. Also, except for particular modifications of physical conditions, the proposed model for spin echoes applies equally well to the nuclear resonance effect in solids and also to resonance of other types of gyromagnetic bodies.

An inductive transmitter or driving coil which surrounds the nuclear sample containing the ensemble of nuclear gyromagnetic resonators is tuned to the Larmor frequency $\omega_0$ where $\omega_0$ is the center frequency which is characteristic of the predominant isochromatic moment. Radio frequency energy is inserted into the tuned inductive-capacitiv circuit in the form of short intense pulses. Each pulse lasts for $t_w$ seconds during which time approximately $\omega_0 t_w$ oscillations take place. The useful intensity of the radio frequency is $H_1$ gauss, which is that rotating vector field which is effective in precessing the magnetic moment through angle $\theta$ from the z axis. An alternating magnetic field may be represented as the sum of two magnetic field components rotating in opposite directions at the same rate. The component rotating in the direction that the nuclear magnetic moment vector precesses in the $H_0$ field may force another component of nuclear precession about its direction in space if the radio frequency is synchronous with the natural Larmor frequency of the nuclear moment vector in the $H_0$ field, but the component rotating in the opposite direction exerts a torque on the nuclear magnetic moment alternately one way then the other and its effect is therefore zero. The useful component $H_1$ is the component of the magnetic field rotating in the useful direction. In general, the pulses may separately have any shape, intensity and width.

We shall now proceed to impose special conditions for purposes of clearly explaining the echo effect model. According to the description in the above cited patent, the nuclear magnetic moments in the field $H_0$, after having precessed and then damped out after initial application of the $H_0$ field, will find themselves subjected to a new torque if the radio frequency magnetic field $H_1$ is suddenly turned on in the form of a pulse. We shall assume that $H_1$ is turned on infinitely fast, and that it shall be removed after $t_w$ seconds infinitely fast. The applied driving radio frequency pulse of $H_1$ may also be termed a torsional information pulse of resonant frequency. During the time $t_w$, all isochromatic moments will be turned away or rotated from the z axis (in thermal equilibrium) toward the xy plane (refer to Figure 1). The driving radio-frequency pulses may be transmitted by the same coil used for receiving or detecting the signals, or two separate coils perpendicular to each other may be used, one for transmitting and one for receiving. If $H_1$ rotates in the xy plane at a frequency $\omega$, all those isochromatic moments which are tuned to Larmor frequency $\omega_0$ different from $\omega$ will, strictly speaking, not precess exactly in a plane perpendicular to the direction of $H_1$. However, $H_1$ is chosen to be sufficiently intense so that most of the isochromatic moments are rotated into the xy plane in a time short compared to the time needed to get out of step with $H_1$; therefore all the isochromatic moments are substantially in phase at the time $t_w$ when they have reached the xy plane. At this time $t_w$ the field $H_1$ is suddenly removed. The induced output signal in the receiver or pick-up coil will persist after the field $H_1$ is removed but will rapidly die out because each isochromatic moment is now free to precess at its own natural frequency, and since these frequencies differ for each isochromatic moment, the moments will, after a short time, get out of phase with each other and their individual inductive effects will mutually cancel. The time required for this loss of a net observed induced output signal resulting from the interference among the isochromatic moments is determined by the inhomogeneity of the magnet. After such a time, the isochromatic moment vectors are uniformly distributed about the z axis and their separate inductive effects are mutually cancelled, but the original magnitudes of these isochromatic moments are preserved. Although these isochromatic moments do not provide a resultant magnetic moment large enough to induce an observable output signal, they do have definite phase relations among themselves. In other words, the resonators are excited to phase-divergent Larmor precession in mutual phase memory relation. Each vector occupies a position which has been determined by its past history. At a time $\tau$ after cessation of the first pulse, a second pulse is transmitted to the driving coil. For the purpose of this description, the second pulse is either of the same intensity and twice as long as the first pulse (as shown in Fig. 1) or twice as intense with the same duration as the first pulse. From the time $H_1$ appears again in the xy plane, i.e., from the time a torsional recollection pulse of resonant frequency is applied, each isochromatic moment vector precesses in a cone whose axis is in the direction of $H_1$. At the instant the second pulse is removed, all vectors will have been rotated from whatever xy plane quadrants they happened to have been in (at the onset of the second pulse) on one side of $H_1$ to a mirror image position on the opposite side of $H_1$. The second pulse, so to speak, has flipped the "pancake" of isotropically distributed moments by 180°. When this flip has occurred it can be seen that if we choose some central average isochromatic moment in the spectrum as a reference, each isochromatic moment which lay ahead of this reference isochromatic moment by a given amount before the second pulse now lies behind that moment after the flip by the same amount and each isochromatic moment which lay behind the reference isochromatic moment by a given amount will lie ahead by the same amount. Now if these isochromatic moments continue to change phase as previously, those behind the reference isochromatic moment will be catching up and those ahead will be falling back. Or, stated in another way, the precessional phase-divergence will be changed to phase-convergence. Hence, at time $\tau$ beyond the second pulse, all the isochromatic moment vectors will be back in phase and the echo of the first pulse induced in the pickup coil from the delayed energy output from the ensemble will occur at time $2\tau$, where $\tau$ is the time between the first pulse and the second or reversing pulse. This can be seen by tracing the history of a pair of isochromatic vectors from Figure 1. At the onset of the first pulse, which may be termed an information pulse, the isochromatic moments $M_0$ lie on the $z$ axis at thermal equilibrium in (A). Following a rotation of 90° in (B) by the first pulse, the isochromatic moments spread out as shown in (B'). During this time, an induction signal forms as a "tail" following the first pulse. At (C) and (C') the tail is absent because the isochromatic moments are evenly distributed in the $xy$ plane. Follow, for example, the precessional motion of isochromatic moment vectors V and V' shown in (B'). At (C') they happen to be oriented in positions indicated at the onset of the second pulse, which may be termed a recollection pulse, which now rotates them and the whole array in the $xy$ plane by 180°, as shown in (D). After the pulse is removed at (D), the vectors V and V' will proceed to precess through angles in the $xy$ plane again in a time $\tau$ as they did after the first pulse. They obviously must coincide at the time of the echo at (E). This argument holds for every pair of vectors in the ensemble for the special case given here. The spin echo has a shape which grows and dies out symmetrically in the time it takes for the isochromatic moments to get in phase and then out of phase.

It should be noted at this point that although it has been assumed for the sake of simplicity that the first pulse rotates all the vectors by 90°, and the second pulse rotates them by 180°, this merely happens to be the rotation which will give the maximum available echo, but useful results may be had by use of other arbitrary combinations of $t_w$ and $H_1$ giving different angles of rotation. For example, the second pulse may be of equal length and equal intensity as the first pulse, in which case the array is rotated 90° rather than 180° as above described. The apparatus to be subsequently described is designed to produce the 90° rotation of the array. Also, the first signal may be a signal of arbitrary character rather than a pulse, and some latitude exists in the relative strength of the reversing pulse.

The echo effect can be explained from a very simple analogy. Let a team of runners who all have different speeds start off at a time $t=0$ as they would do at a track meet. At some time $t_1$ these runners will be distributed around the race track in apparently random positions. The referee fires his gun at a time $t=\tau$, and by previous arrangement the racers quickly turn about-face and run in the opposite direction with their original speeds. Obviously, at a time $t=2\tau$, the runners will return together precisely at the starting line. This will happen once and only once, just as it happens in the case of two pulses and the echo. From this analogy, one can see that if even more than two pulses are applied to the ensemble, a pattern of echoes or constructive interference events will occur which will uniquely be related to the pulses which were applied in the past. For example, if the referee again fired his gun for a third time after the racers came together at the starting point and fanned out again around the track, and the runners again repeated the about-face procedure, they would again come back to the starting line. Detailed considerations of multiple echo patterns are presented in a paper in the Physical Review 80, 580 (1950), by E. L. Hahn.

Useful information about molecules can be obtained from a measurement of the maximum amplitude of the induced echo signal for a given time $\tau$ between two radio frequency driving pulses. The shape of the echo signal itself provides (a) information about the gradient of the external magnetic field $H_0$ over the sample. This is well illustrated in Figs. 4(a) and (b). These two figures are traces of the induced signals due to the two driving radio frequency pulses and the delayed echo signal on a cathode ray screen. The matter containing the nuclei was the same in both cases, glycerine, but in Fig. 4(a) the sample was located in a unidirectional field $H_0$ of good homogeneity while in Fig. 4(b) the same sample was located in a field $H_0$ of poor homogeneity. The echo signal shape will also indicate in certain cases (b) whether two or more nuclear magnetic moments have resonance frequencies which lie very close together. For example, Figs. 6(a), (b) and (c) illustrate traces for three different substances wherein two or more nuclear magnetic moments have resonance frequencies lying close together. Fig. 6(a) shows the induced signals due to the two radio frequency pulses and also the induced echo signal in the mixture $CF_3CCl=CCl$ and 1,4 - difluoro - benzene ($C_6H_4F_2$). Figs. 6(b) and (c) show similar traces using the two mixtures $CF_3CCl=CCl_2$ and 1,2,4-trifluorobenzene ($C_6H_3F_3$) and 1-trifluoro-methyl 2,3,6-trifluorobenzene ($C_6H_2F_3CF_3$). A proper interpretation of the echo signal shape can distinguish whether it is to be interpreted in the sense of (a) or (b).

If the maximum echo signal amplitude is measured for increasing values of $\tau$, where for each setting of $\tau$ the ensemble is initially at thermal equilibrium, a plot of the variation in the echo signal amplitude is obtained as a function of $\tau$. In Fig. 5 is shown a plurality of superimposed oscillograph traces produced by the induced signals due to the first and second radio frequency pulses and the resultant delayed echo signals of a plurality of successive pulse pairs as the time interval between pulses is progressively varied. The induced signals due to the initial radio frequency pulse for each separate trace are superimposed exactly one on another and blend into the one trace (a). The time $\tau$ between the first pair of pulses is $1/300$ second and for each succeeding pulse pair the interval $\tau$ is increased by $1/300$ of a second. The signals due to the first pair of pulses are labeled $a$, $a_1$ and $a_2$, $a$ being the induced signal due to the first pulse, $a_1$ being the induced signal due to the second pulse and $a_2$ being the echo pulse. The signals due to the second pair of pulses are labeled $a$, $b_1$ and $b_2$, $a$ being the induced signal due to the first pulse, $b_1$ being the induced signal due to the second pulse and $b_2$ being the echo signal. Signals following in subsequent order are labeled $a$, $c_1$, $c_2$; $a$, $d_1$, $d_2$; etc. Tracing through the points of maximum amplitude of the echo signals will give an envelope with exponential decay. The echo signal envelope plot may be obtained in this manner or possibly in other ways which do not require that the ensemble be at equilibrium for each pair of pulses. The shape of the envelope is useful for (1) the analysis of molecular species which contain resonant nuclei; (2) as an indication of the amount of molecular agitation, diffusion and motion; (3) as an indication of the presence of paramagnetic substances; and (4) as an indication of coupling between nuclear moments in certain instances. In the latter case, the echo envelope does not decay monotonically, but exhibits a modulation beat. This effect is discussed by E. L. Hahn and D. E. Maxwell in Physical Review 84, 1246 (1951), and Physical Review, December 1952. The dominant feature of the echo signal envelope will be that it decays with time. In the case of the race track analogy, assume that the runners fatigue after the start of the race. For this reason they may change their speeds erratically or even drop out of the race completely. Consequently, following the second gun shot (the second pulse) some of the racers may return together at the starting line but not all of them. In the nuclear spin system a similar situation prevails: either (1) the nuclear spins cease precession altogether or (2) they lose phase memory of Larmor precession. The effect (1) occurs when the magnetic energy of precession contained by the moment is transferred to a molecule completely in the form of kinetic energy. The time in which this effect (1) occurs is called $T_1$, the spin-lattice thermal relaxation time. The effect (2) arises when magnetic energy is transferred from spin to spin. One must also add to this the effect due to fluctuating local magnetic fields caused by neighboring moments and paramagnetic substances. The overall time which relates to processes in the lattice which shorten the phase memory of precession is denoted by $T_2$. This includes the effect of $T_1$ as well.

Another influence which destroys the phase memory of precession, but is particularly manifested by this invention is that due to the self diffusion of molecules which contain resonant nuclei. Since there is an established gradient of the magnetic field over the volume of the sample, a molecule whose nuclear moment has been flipped initially in a field $H_0$, may, in the course of time $2\tau$, drift by Brownian motion into a randomly differing field $H_0$. Therefore, as $\tau$ is increased, a lesser number of moments participate in the generation of in-phase nuclear radio frequency signals. The theory of the diffusion effect can be incorporated into the nuclear equations, and a useful expression is obtained by which the self diffusion coefficient of molecules can be measured from the plotted envelope curve and known parameters.

It is possible to measure the amount of thermal relaxation, $T_1$, independently of all other effects by measuring signals proportional to the excess population of moments in the $z$ direction at any time. This can be done by measuring the amplitude at some arbitrary point on the free induction tail following the second frequency pulse. This is compared to the amplitude at the corresponding point on the free induction tail on the induced signal following the first pulse, which is the amplitude proportional to the maximum available moment $M_0$. It can be shown that if $$\frac{\mu}{I}H_1 t_w = \pi/2$$

for both pulses, then the tail signal following the second pulse is proportional to the number of magnetic moments which have been thermally relaxed during the time $\tau$. There are alternate methods of measuring $T_1$, for instance, from the observation of echoes obtained from an application of more than two radio frequency pulses. These are discussed in the literature (Physical Review 80, article mentioned above), and one of them is directly connected also with the method for measuring self diffusion coefficients.

We will now present a description of the particular apparatus used in this preferred embodiment of the invention, and how it functions to provide the echo as described in the case for two radio-frequency pulses. Although the apparatus, as specifically referred to in Figures 2 and 3, applies to a special case, it can be made to provide echoes of arbitrary shape, number, and amplitude from a set of pulses of the appropriate type. This may be realized by the addition of the appropriate types of electronic channels and units, similar to the ones shown for the special case.

Referring to the drawings.

Figs. 4(a) and (b) show two traces of the induced signals due to the first and second radio frequency pulses and the delayed echo signal as reproduced from the screen of the cathode ray tube by means of a camera.

Fig. 5 shows a plurality of superimposed traces on the screen of a cathode ray tube produced by the induced signals due to the first and second radio frequency pulses and the resultant delayed echo signals for nuclear resonance in ferric nitrate as the time interval between pulses is progressively varied. The superimposed traces were taken by multiple exposures of a camera.

Figs. 6(a), (b) and (c) show traces of the induced signals due to the two pulses and echo as shown on the screen of a cathode ray tube for three different samples of matter containing nuclei.

Figure 1:
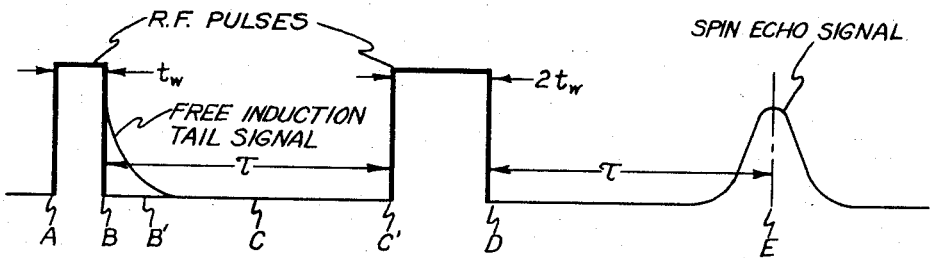
Figure 1 is a schematic drawing, illustrating the manner in which isochromatic moment vectors precess in order to form in-phase signals following the first pulse and during the echo. Reference to Figure 1 has been made in the explanation of the echo effect above.
Figure 1:
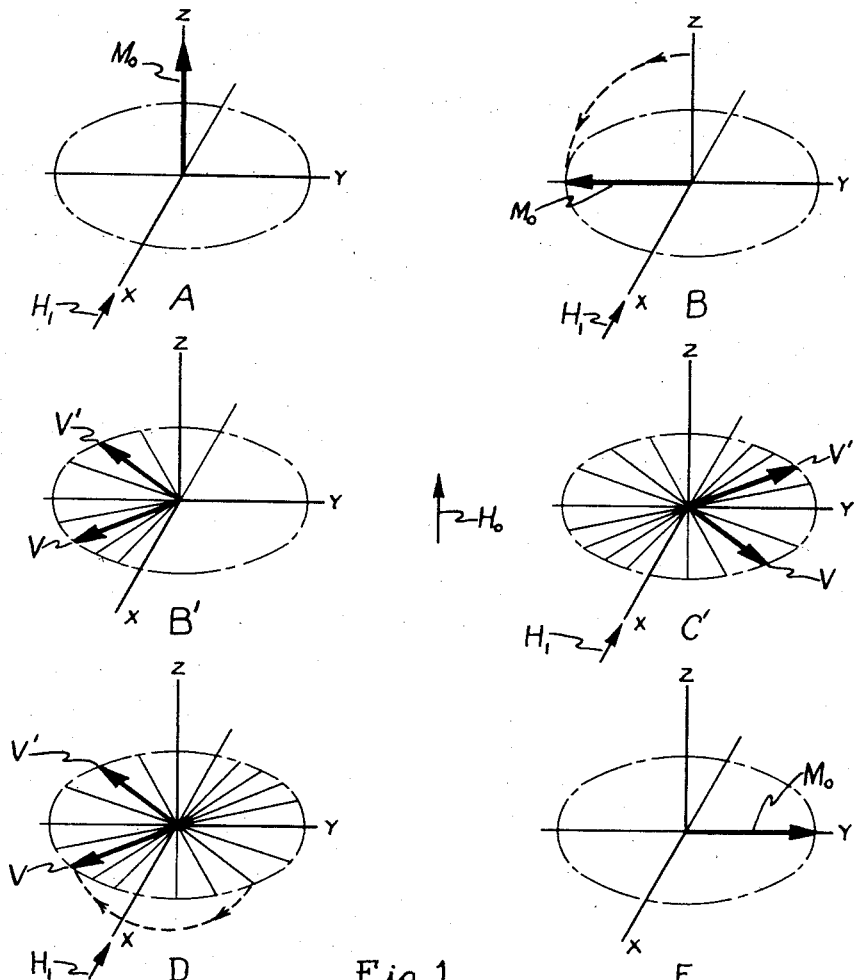
Figure 2:
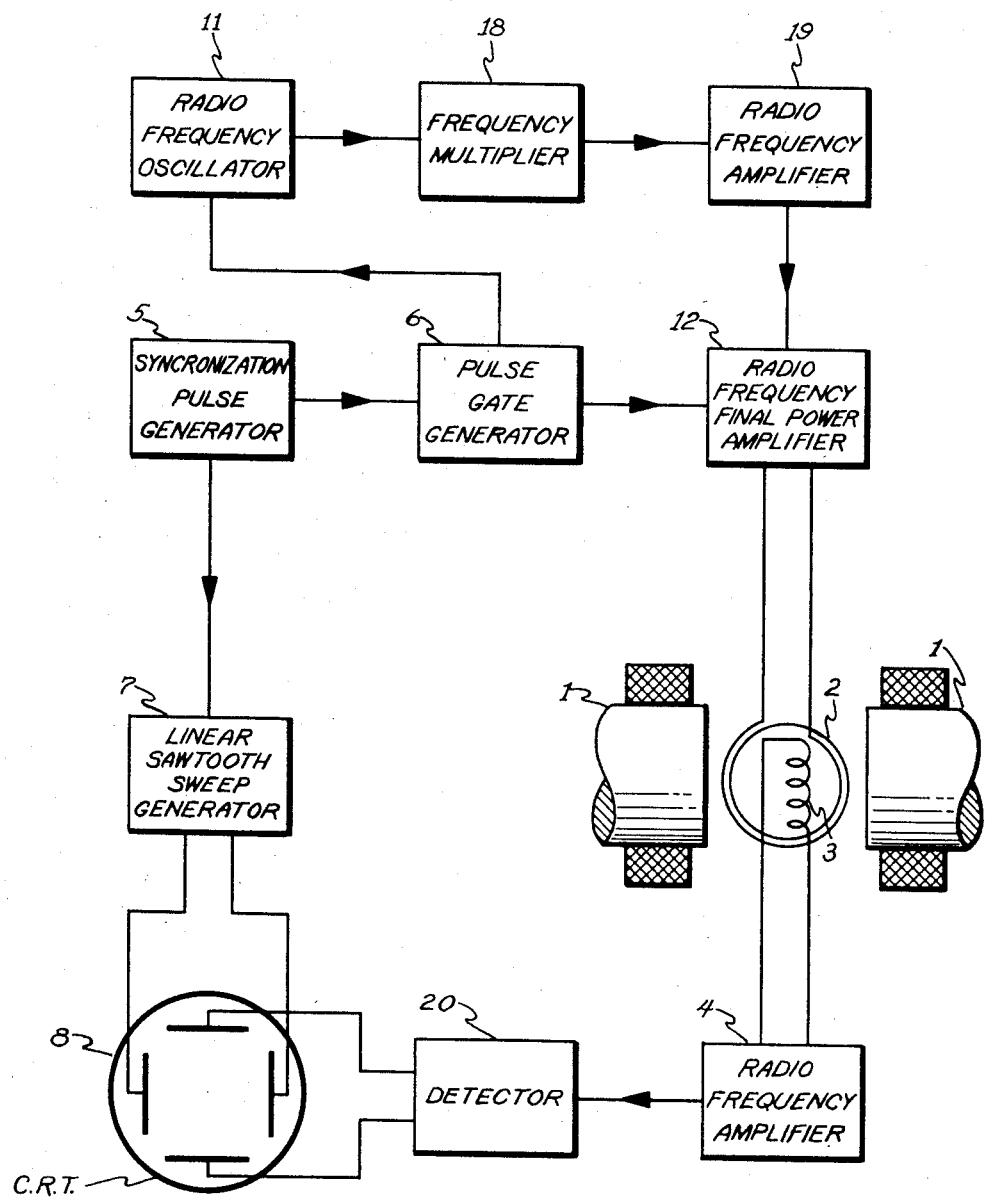
Figure 2 is a block diagram of the apparatus.

Referring to Figure 2, an electromagnet 1 (or a suitable permanent magnet) provides a large, constant magnetic field $H_0$ which polarizes, in the sample of matter located in the field $H_0$, a macroscopic magnetic moment $M_0$ in the $z$ direction, as indicated by the vector in Figure 1–A. An inductive coil 2, which is tuned to the average Larmor frequency of the nuclear moments, surrounds the sample of nuclear moments. The axis of coil 2 is perpendicular to the direction of $H_0$, and a second coil 3 is oriented around the sample symmetrically with its axis perpendicular to the axis of coil 2. Transmitter coil 2 serves to transmit pulsed R-F power to the nuclear sample. Receiver or pick-up coil 3, which is also tuned to the Larmor frequency, serves to receive nuclear radio-frequency signals due to free Larmor precession, principally those due to spin echoes, and convey them to the R-F receiver amplifier 4. Alternative schemes are possible in which coil 3 can be eliminated and coil 2 can serve both as transmitter and receiver (see the article by E. L. Hahn, Phys. Rev. 80, 580 (1950). The scheme as shown is merely illustrative of a means by which strong voltage disturbances due to transmitter R-F pulses are decoupled from the sensitive R-F receiver amplifier 4.

Figure 3:
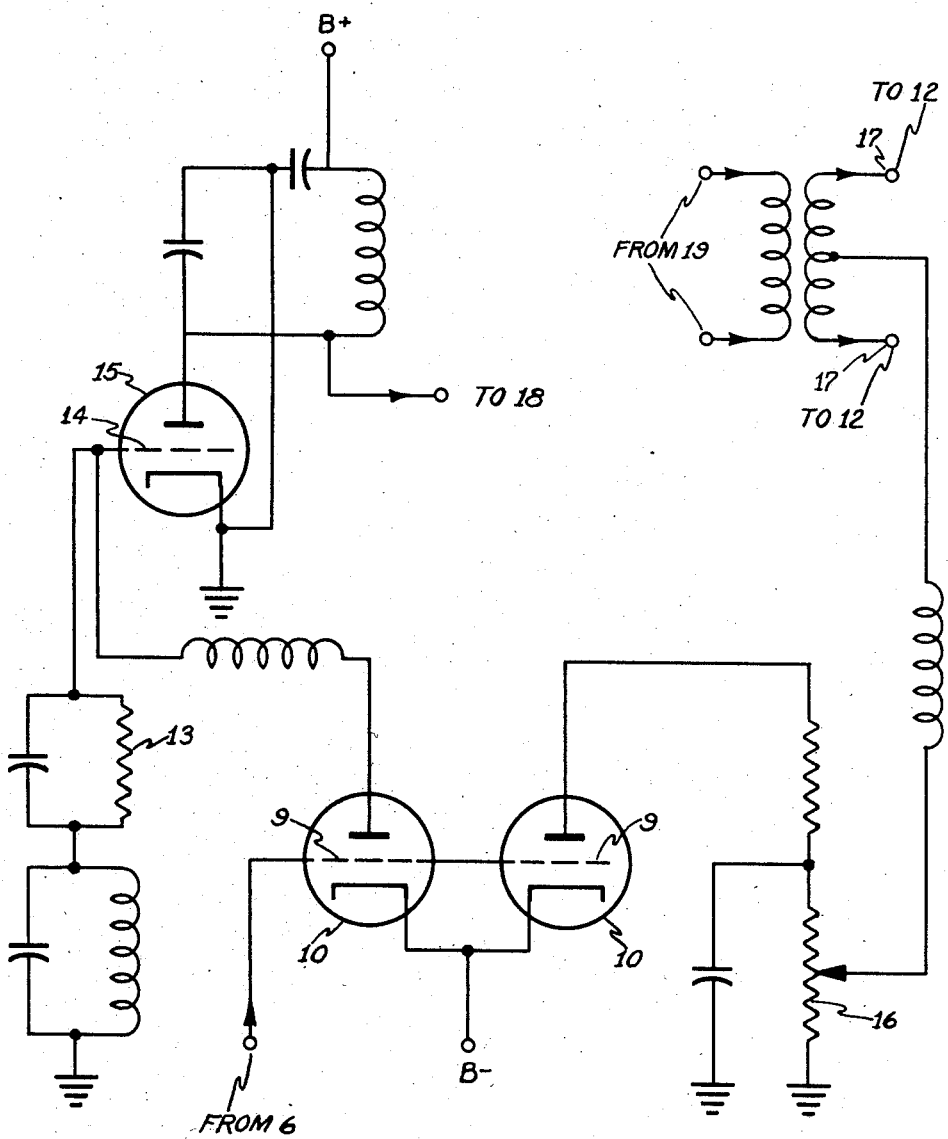
Figure 3 is an electronic schematic diagram of those features in the block diagram of Figure 2 which are illustrative of the pulsed technique of nuclear induction.

The time sequence of electronic operations which finally lead to the formation of the spin echo signal shall be outlined. The synchronizing pulse circuit 5 may consist of a conventional arrangement of multivibrator units in cascade. For our simple case unit 5 provides extremely narrow twin pulses, separated by time $\tau$, which repeat at an arbitrary repetition rate. This rate is determined by the thermal relaxation time $T_1$ of the nuclear sample. In order to obtain an appreciable amplitude of echo signals, the time between repetitions of successive pairs of pulses is usually chosen to be five to ten times the value of $T_1$. These pulses are sent into the pulse gate forming unit 6. The first pulse of each pair initiates the sawtooth voltage sweep in the cathode ray oscillograph sweep generator 7, and an electron beam begins to move across the face of the cathode ray tube 8. The pulse gate unit 6, which may consist of a conventional one-shot multivibrator circuit, forms negative square wave voltage signals of arbitrary amplitude and width $t_w$ seconds. In Figure 3, these two successive negative square wave pulses appear on the grids 9 of tubes 10, which form a part of the pulse gate unit, with width $t_w$ seconds and a separation of $\tau$ seconds. The voltage is sufficiently negative during the pulse time so that both triodes 10 are rendered non-conducting.

Although in this description we shall apply two R-F pulses to the sample of equal widths $t_w$ and equal intensity $H_1$, the principle by which the echo is formed is not altered from that in the previous explanation, where it was assumed that the second pulse be twice as wide as the first one.

In the absence of negative square wave signals on the grids 9, sufficient plate current is conducted by both triodes 10 to maintain (a) the master R-F oscillator unit 11 (Figure 2) completely cut off and (b) the final power R-F amplifier unit 12 (Figure 2) simultaneously completely cut off. This is accomplished as seen from Figure 3. A large negative D.-C. voltage across resistance 13, which is applied to the master oscillator grid 14, is sufficient to cut off the oscillator tube 15 of the master radio frequency oscillator unit 11. Also a negative D.-C. voltage of the appropriate value developed across resistance 16 is applied, at terminals 17 to the grids (not shown) of a convention push-pull R-F power amplifier tube, in final power amplifier 12, and it is rendered non-conducting. As soon as the triodes 10 are cut off by the negative square pulses on grids 9, direct current ceases to flow through resistances 13 and 16. Consequently, the master oscillator unit 11 (Figure 2) starts into oscillation (i.e. the oscillator tube 15, Figure 3, now conducts). Simultaneously, the final power amplifier 12 (Figure 2) is brought into conduction and amplifies the R-F pulses which derive from units 11, 18 and 19 in succession. Since it is a conventional technique to operate a source of radio-frequency oscillations at a frequency which is a sub-harmonic of the frequency desired, unit 18 serves to multiply the lower frequency to the desired value. Unit 19 is a conventional intermediate R-F amplifier which provides sufficient voltage to drive the power amplifier stage 12.

Radio-frequency oscillations which last for $t_w$ seconds in the form of two successive square pulses are transmitted from amplifier 12 to the tuned transmitter coil 2. In accordance with the principle of gyromagnetic action outlined previously, the ensemble of nuclear moments becomes oriented by the R-F pulses in such a way that the induced spin echo signal will appear, spontaneously in a time $2\tau$, in the absence of the driving pulses, on the oscilloscope sweep screen 8 after having been amplified by the receiver 4 and detected by detector 20. The entire process is repeated at a convenient repetition rate which is determined by an adjustment of the synchronization unit 5, Figure 2. The induced echo signal will appear to be constantly on the cathode ray tube screen 8 because of the persistence of the electron beam trace.

The envelope of the maximum amplitude of the induced echo signal can be plotted out conveniently by continuous increase of the time $\tau$ between synchronizing pulses in unit 5. The first R-F pulse will always appear at the beginning of the cathode ray sweep and the second pulse is made to move further out for each observation of the echo. Consequently, the useful information obtainable from the echo envelope, and from the echo itself, may be recorded, for example, by camera. Referring to Fig. 5 there is shown therein the traces on the screen of cathode ray tube 8 as taken by the camera. This multiple exposure shows the induced signal due to the first radio frequency pulse, the second induced signal due to the second radio frequency pulse and the resultant spin echo signal for a successive number of paired pulses. The first pulse of each pair is shown at the same initial position on the picture at the left-hand side. The original time $\tau$ between pulses was 1/500 of a second and for each succeeding pulse pair the interval $\tau$ is increased by 1/300 of a second. The spin echo signals are therefore spaced 2/300 of a second apart.

In all of the above-mentioned cases where an observed induced signal is displayed on the cathode ray screen it is feasible to measure the induced signals and compare their various shapes and sizes by the use of a graphic cathode ray screen. In measurements of the induced signals, meters could also be employed.

The particular scheme discussed here for measuring induced echo signal amplitudes as a function of $\tau$ relies upon the initial condition that the spin ensemble be allowed to return to appreciable thermal equilibrium between paired R-F pulses. Therefore, only one observation, for a particular $\tau$, is made for each sweep of the cathode ray tube 8. There are alternative schemes by which a steady succession of R-F driving pulses of the appropriate type may be applied to the sample of matter so as to give a corresponding succession of induced echo signals whose amplitudes, upon proper interpretation, give the requisite information which is useful in this invention.

The particular scheme, as discussed here, is to be taken merely as illustrative and not definitive of the means by which this invention may be applied, inasmuch as the circuits used in this scheme are well known in the radio art.

Although the description given above considers the ensemble of magnetic moments to be a sample of nuclear magnetic moments, it should be pointed out that the spin echo technique is not limited to the use of nuclear magnetic moments alone but is applicable to the other types of gyromagnetic bodies. For example, the technique is applicable when the sample consists of certain chemical preparations containing ionic free radicals. In these cases the gyromagnetic bodies are electrons, and except for the fact that the gyromagnetic ratio, $\mu/I$, for electrons is very much larger than for nuclei, the spin echo technique to be used in this case is identical to that described above.

Modifications of the technique heretofore described can take numerous forms. For example, to properly correlate the polarizing field and applied radio frequency field, the radio-frequency field, instead of being pulsed in amplitude, can have constant amplitude but be pulsed in frequency, such that the frequency of the R-F field is at or near the resonance frequency during a pulse and off resonance at other times. In another modification, the R-F field is constant in amplitude and frequency but the polarizing magnetic field $H_0$ is varied, such that the gyromagnetic bodies are in resonance during a pulse of the magnetic field $H_0$, and out of resonance at other times. A description of the mechanism by which spin echo signals form in these cases is similar to that heretofore given, for a radio-frequency magnetic field that is not in resonance with the gyromagnetic bodies has very little effect on the motion of said bodies in the polarizing field, and the motion is therefore identical to that in the case where there is no R-F field at all.

Since many changes could be made in the above construction and many apparently different embodiments could be made without departing from the scope thereof, it is intended that all matter contained in the above description or shown in the accompanying drawings shall be interpreted as illustrative and not in a limiting sense.

What I claim is:

1. Gyromagnetic memory resonance apparatus for obtaining delayed energy return from gyromagnetic memory resonators located in a polarizing magnetic field comprising means coupled to said gyromagnetic memory resonators for supplying radio frequency magnetic field energy to said resonators and for detecting radio frequency magnetic field energy produced by the precessions of said resonators, means operative to bring the frequency of said supplied radio frequency energy and the Larmor frequency of precession of said gyromagnetic resonators in the polarizing field into substantial coincidence to thereby produce Larmor precession of said resonators, and timer means coupled to said last means operative to bring said supplied radio frequency and the Larmor frequency of precession into substantial coincidence during a plurality of spaced-apart time intervals whereby pulse information may be stored in said precessing resonators and subsequently recovered from said precessing resonators as spin echo memory pulses.

2. Gyromagnetic memory resonance apparatus as claimed in claim 1 in which the gyromagnetic memory resonators comprise nuclei.

3. Gyromagnetic memory resonance apparatus as claimed in claim 1 wherein said first mentioned means comprises at least one radio frequency coil surrounding said gyromagnetic memory resonators and positioned substantially normal to the direction of the polarizing magnetic field.

4. Gyromagnetic memory resonance apparatus as claimed in claim 1 including means for indicating the characteristics of the delayed energy return.

5. Gyromagnetic memory resonance apparatus for obtaining delayed energy return from matter containing an ensemble of gyromagnetic memory resonators comprising means for producing a polarizing magnetic field enveloping said matter to polarize the bodies therein, means coupled to said matter operative to excite the memory resonators with a radio frequency magnetic field at the Larmor frequency of the resonators in the polarizing field and at an angle to said polarizing field, timer means coupled to said means for producing a plurality of spaced pulses of said radio frequency field including at least one information pulse and at least one subsequent recollection pulse whereby pulse information may be stored in the precessing memory resonators and subsequently recovered from said precessing memory resonators as free precession spin echo signals, and receiver means activated by said spin echo signals.

6. Gyromagnetic memory resonance apparatus as claimed in claim 5 in which the gyromagnetic memory resonators comprise nuclei.

7. Gyromagnetic memory resonance apparatus as claimed in claim 5 including indicator means coupled to said receiver means for indicating the characteristics of the delayed energy return.

8. Gyromagnetic memory resonance apparatus for obtaining delayed free precession signals from matter containing gyromagnetic memory resonators comprising means for producing a polarizing magnetic field, enveloping the matter to thereby polarize the gyromagnetic memory resonators in the field, means coupled to the matter for exciting the resonators with radio frequency magnetic field energy so as to produce gyromagnetic resonance of the memory resonators when the characteristics of the field and the radio frequency energy are properly correlated such that the Larmor frequency of the memory resonators in the polarizing field and the frequency of the radio frequency energy substantially coincide, means coupled to said last means for producing said correlation between the applied radio frequency energy and the polarizing field during a plurality of spaced-apart time periods to produce a forced Larmor precession of said memory resonators in said polarizing field during said time periods, the forced precessions during at least one of said time periods serving to store an information signal in said gyromagnetic memory resonators and the forced precessions during at least one subsequent time period serving to condition the memory resonators to return a delayed free precession signal corresponding to the stored information signal, and means for detecting said delayed signal.

9. Gyromagnetic memory resonance apparatus as claimed in claim 8 wherein said means for producing said correlation comprises timer pulsing means coupled to said radio frequency energy means for producing at least one information radio frequency pulse during said one time period and at least one recollection radio frequency pulse during said subsequent time period.

10. Gyromagnetic memory resonance apparatus as claimed in claim 8 wherein said means for detecting said delayed signal comprises means for indicating the characteristics of the delayed signal.

11. Gyromagnetic memory resonance apparatus for obtaining delayed free precession spin echo memory energy return from matter containing gyromagnetic memory resonators comprising means for producing a polarizing magnetic field, means for positioning said matter in said field to thereby polarize the resonators therein, means for exciting the resonators with a plurality of sets of pulses of radio frequency electromagnetic energy at an angle to the polarizing field, the frequency of the energy being at or near the resonant frequency of the resonators in the polarizing field, the sets of pulses being equally spaced in time each from the preceding set, the pulses in each set being time-spaced, the time between pulses in each set being progressively longer for each set, at least one pulse in each set serving to rotate the resonators through an angle relative to a direction of the polarizing field, the resonators precessing in said polarizing field in a phase divergent manner after termination of said pulse, and at least one subsequent pulse in each set serving to rotate the resonators through a further angle relative to the direction of the polarizing field, whereby, upon termination of said subsequent pulse, said resonators precess in said polarizing field in a phase convergent manner to thereby condition the resonators to return a plurality of delayed pulses of radio frequency energy, and receiver means associated with the resonators for amplifying the delayed energy return.

12. In gyromagnetic memory resonance apparatus of the class wherein matter containing gyromagnetic memory resonators is located within a means for producing a polarizing magnetic field and wherein energy translating means is coupled to the matter for providing radio frequency energy to the resonators at the Larmor frequency of the gyromagnetic resonators in the polarizing field to produce precession of the resonators in the polarizing field and for detecting radio frequency energy from the matter due to the precessing resonators after reaction with the provided radio frequency energy; generator means coupled to said energy translating means for providing the radio frequency energy in pulses of predetermined number having definite characteristics at predetermined space intervals, at least one of said pulses being an information storage pulse which is stored in said resonators and at least another subsequent pulse being a recollection pulse which conditions the memory resonators to return a delayed spin echo pulse corresponding to the stored information.

13. In gyromagnetic memory apparatus of the class wherein matter containing gyromagnetic resonators is located within a polarizing magnetic field and wherein energy translating means is coupled to the matter for providing radio frequency energy to the resonators at the Larmor frequency of the gyromagnetic resonators in the polarizing field and for detecting radio frequency energy from the resonators due to the precessing resonators after reaction with the provided radio frequency energy; an oscillator coupled to said energy translating means for providing said radio frequency energy and a gate controlled circuit coupled to said oscillator for causing said oscillator to provide the energy in recurring pulses of predetermined characteristics at predetermined space intervals, at least one of said pulses being an information storage pulse which is stored in said resonators and at least another subsequent pulse being a recollection pulse which conditions the resonators to return a delayed spin echo memory pulse corresponding to the stored information.

14. A gyromagnetic memory resonance system for obtaining delayed energy output from matter containing gyromagnetic portions of atoms polarized in a field in which they may precess comprising means for applying a plurality of time spaced pulses of radio frequency energy to the polarized portions of atoms at an angle to the direction of polarization to cause said atom portions to precess in said field at said radio frequency, selected ones of said pulses representing pulses to be remembered, the frequency of said radio frequency energy being substantially equal to the Larmor frequency of the atom portions in said polarizing field, and means for receiving a pulse of radio frequency energy from said precessing atom portions at a time period after the application of the plurality of pulses which are remembered.

15. A gyromagnetic memory resonance system for obtaining delayed energy output from matter containing gyromagnetic portions of atoms polarized in a field in which the atom portions may precess comprising an oscillator for generating radio frequency energy inductively coupled to said matter, the frequency of said oscillator being substantially equal to the Larmor precession frequency of said atom portions in the polarizing field, timer means coupled to said oscillator for causing transmission of said radio frequency energy in at least two time-spaced pulses to said matter to cause said portions of atoms to precess in said polarizing field in response to said radio frequency energy pulses, selected ones of said pulses representing pulses to be remembered, said atom portions precessing responsive to the applied impulses such that they produce at least one spin echo pulse of radio frequency energy a predetermined time period after the last applied pulse, and receiver means for detecting the delayed spin echo pulses produced by the precessing atom portions.

16. A gyromagnetic memory resonance system as claimed in claim 15 wherein said receiver means comprises a radio frequency energy translating means coupled to said ensemble.

17. In combination, a sample of material having gyromagnetic memory resonators therein, means for producing an inhomogeneous polarizing magnetic field for aligning the memory resonators therein, a plurality of information-signals entering means to excite said memory resonators to differential frequency precession in said polarizing field in mutual phase-memory relation, and means to educe information echo signals from said precessing memory resonators within the time persistence of said phase memory relation.

18. Apparatus for obtaining gyromagnetic free precession spin echo signals from a sample of matter comprising, in combination, means to establish a polarizing magnetic field enveloping said sample to polarize the gyromagnetic memory resonators thereof, said field having a normally fixed spectrum of strength inhomogeneity, means to apply radio frequency torsional magnetic information and recollection pulses to said gyromagnetic memory resonators, timing means to initiate said information pulses during an information-entering period and to initiate a recollection pulse in a second subsequent time period, whereby said gyromagnetic memory resonators may form spin echo memory pulses by differential free precession to constructive magnetic interference in a third time period following said second period, and receiver means for amplifying said spin echo memory pulses.

19. Apparatus for obtaining delayed free precession signals from matter containing atom portions possessing the properties of magnetic moment and gyroscopic moment which comprises means for producing a unidirectional polarizing magnetic field enveloping the matter to polarize the atom portions in the direction of the polarizing field, radio frequency means for applying at least one pulse of radio frequency electromagnetic energy to be remembered to the matter substantially normal to the polarizing field direction to rotate an ensemble of said atom portions through an angle relative to said polarizing field direction, the frequency of said radio frequency electromagnetic energy being substantially equal to the Larmor precession frequency of the atom portions in said polarizing field, and atom portions precessing freely in said polarizing field after termination of said radio frequency electromagnetic pulse in a phase divergent manner due to the inhomogeneity of the polarizing magnetic field, said radio frequency means being again operative to apply at least one further pulse of radio frequency electromagnetic energy to said atom portions at an angle to the direction of the unidirectional magnetic field to rotate said ensemble of atom portions through a further angle relative to said polarizing field direction, the frequency of said radio frequency electromagnetic energy being substantially equal to the Larmor precession frequency of said atom portions, said atom portions freely precessing in said polarizing field after termination of said second radio frequency pulse in a phase convergent manner whereby said atom portions subsequently converge to produce at least one delayed electromagnetic signal corresponding to the remembered radio frequency pulse, and receiver means energized in response to said delayed signal.

20. Apparatus as claimed in claim 19 wherein said radio frequency means for applying said torsional pulses comprises a radio frequency coil surrounding said matter.

21. Apparatus as claimed in claim 20 wherein said radio frequency coil also serves as a component of said receiver means.

References Cited in the file of this patent

UNITED STATES PATENTS

| | | |
|---|---|---|
| 2,561,489 | Bloch et al. | July 24, 1951 |
| 2,561,490 | Varian | July 24, 1951 |
| 2,590,308 | Gordon | Mar. 25, 1952 |

OTHER REFERENCES

Hahn: Physical Review, vol. 76, No. 1, pp. 145, 146, July 1, 1949.

Torrey: Physical Review, vol. 76, No. 8, pp. 1059–1066, Oct. 15, 1949.

Hahn: Bulletin of American Physical Society, vol. 24, No. 7, p. 13, Nov. 25, 1949.

Hahn: Physical Review, vol. 77, No. 2, pp. 297, 298, Jan. 15, 1950.